United States Patent
Takizawa et al.

(10) Patent No.: US 7,540,147 B2
(45) Date of Patent: Jun. 2, 2009

(54) MASTER CYLINDER LEVER FOR A HYDRAULIC BRAKE WITH DEAD-BAND ADJUSTMENT MECHANISM

(75) Inventors: Shinichi Takizawa, Sakai (JP); Etsuyoshi Watarai, Sakai (JP)

(73) Assignee: Shimano Inc. (JP)

( * ) Notice: Subject to any disclaimer, the term of this patent is extended or adjusted under 35 U.S.C. 154(b) by 260 days.

(21) Appl. No.: 11/733,748

(22) Filed: Apr. 10, 2007

(65) Prior Publication Data

US 2008/0251334 A1 Oct. 16, 2008

(51) Int. Cl.
*B60T 11/22* (2006.01)
*B62L 3/00* (2006.01)

(52) U.S. Cl. .......................... 60/594; 60/588
(58) Field of Classification Search ............... 60/588, 60/594; 188/26; 74/502.2, 525
See application file for complete search history.

(56) References Cited

U.S. PATENT DOCUMENTS

| 4,963,692 | A | 10/1990 | Halabiya | |
|---|---|---|---|---|
| 6,804,961 | B2 * | 10/2004 | Lumpkin | 60/594 |
| 2006/0185360 | A1 | 8/2006 | Takizawa et al. | |
| 2006/0185943 | A1 | 8/2006 | Takizawa et al. | |

FOREIGN PATENT DOCUMENTS

| DE | 3837650 A1 | 5/1990 |
|---|---|---|
| DE | 20018705 U1 | 12/2000 |
| EP | 1325863 A1 | 7/2003 |
| EP | 1439116 A2 | 7/2004 |
| JP | 2002-211473 A | 7/2002 |

* cited by examiner

*Primary Examiner*—Thomas E Lazo
(74) *Attorney, Agent, or Firm*—Jeffer Mangels Butler & Marmaro, LLP

(57) ABSTRACT

A master cylinder assembly for a bicycle disc brake having a housing defining a cylinder, a piston received in the cylinder, a lever pivotably attached to the housing, and an adjustment guide body that is operatively associated with the piston. The piston is moveable within the cylinder between a select starting position and a pressurized position. The lever is operatively associated with the piston to move the piston from the select starting position to the pressurized position as the lever is pivoted between a rest position and a fully-actuated position. The adjustment guide body is pivotable between a first position and a second position for adjusting the select starting position of the piston.

20 Claims, 6 Drawing Sheets

MASTER CYLINDER LEVER FOR A HYDRAULIC BRAKE WITH DEAD-BAND ADJUSTMENT MECHANISM

FIELD OF THE INVENTION

The present invention relates to master cylinder levers for hydraulic brakes, and more particularly, to a master cylinder lever having an adjustment mechanism for adjusting the starting position of the piston.

BACKGROUND OF THE INVENTION

Many hydraulic brake master cylinders operate in the same basic way. They typically include a master piston in a master cylinder which is actuated by a brake lever. A piston is moveable within the cylinder from a start position near a first end of the cylinder to a pressurized position near the second end of the cylinder. Between the first and second ends of the cylinder is a port in fluid communication between an inside of the cylinder and a hydraulic fluid reservoir. As the piston moves from the start position toward the port, hydraulic fluid flows from the port to the reservoir. Once the seal associated with the piston moves between the port and the second end of the cylinder, fluid within the second end of the cylinder and hydraulic lines in fluid communication with the caliper become pressurized and the caliper is actuated. The travel between the start position of the piston and the timing port is known as the dead-band.

Different structures are known for varying the amount of dead-band. These structure are very complex and difficult to operate. Thus, there is a need for a simple, easy-to-operate structure that may adjust the dead-band.

SUMMARY OF THE PREFERRED EMBODIMENTS

According to one aspect of the present invention, there is provided a preferred embodiment of the present invention, a master cylinder assembly for a bicycle hydraulic disc brake is provided. The master cylinder assembly comprises a housing defining a cylinder having a first end and a second end, a hydraulic fluid reservoir, and a port providing fluid communication between the cylinder and the hydraulic reservoir. A piston having a radial seal is received in the cylinder, wherein the piston is moveable between a select starting position with the seal between the first end of the cylinder and the port and a pressurized position with the seal between the port and the second end of the cylinder. A lever is pivotably attached to the housing, the lever being operatively associated with the piston to move the piston between the select starting position and the pressurized position as the lever is pivoted between a rest position and a fully-actuated position. An adjustment guide body operatively associated with the piston and pivotable between a first position and a second position for adjusting the select starting position of the piston is provided.

In preferred embodiments of the invention, the master cylinder assembly includes an adjustment member having a first end that engages the adjustment guide body. Preferably, the adjustment member comprises an adjustment screw. Movement of the adjustment member causes the adjustment guide body to pivot between the first position and the second position, thereby adjusting the select starting position of the piston. In a preferred embodiment, to select a starting position, when the adjustment screw is rotated in a first direction, the piston is moved toward the port. When the adjustment screw is rotated in a second direction, the piston is moved away from the port. Typically, the second end of the adjustment screw extends outside of the housing.

Preferably, the adjustment guide body comprises first and second ends. The second end includes a protrusion that engages an inside surface of the housing when the adjustment guide body is in the second position, thereby preventing further pivotable movement of the adjustment guide body beyond the second position. Typically, the adjustment guide body comprises an upper surface and a lower surface, wherein the upper surface includes an angled portion adjacent the first end of the adjustment guide body that engages the first end of the adjustment member. In a preferred embodiment, the adjustment guide body comprises a first opening adjacent the second end of the adjustment guide body that has an axle pin extending therethrough. The axle pin engages an inside surface of the housing, thereby providing for the pivotable movement of the adjustment guide body.

In accordance with another aspect of the present invention, there is provided a master cylinder assembly for a bicycle disc brake is provided having a housing defining a cylinder, a piston received in the cylinder, a lever pivotably attached to the housing, and an adjustment guide body that is operatively associated with the piston. The piston is moveable within the cylinder between a select starting position and a pressurized position. The lever is operatively associated with the piston to move the piston from the select starting position to the pressurized position as the lever is pivoted between a rest position and a fully-actuated position. The adjustment guide body is pivotable between a first position and a second position for adjusting the select starting position of the piston.

In a preferred embodiment, the master cylinder assembly comprises an adjustment member having a first end that engages the adjustment guide body. Preferably, the adjustment member is a screw. Movement, preferably rotational movement, of the adjustment member causes the adjustment guide body to pivot between the first position and the second position, thereby adjusting the select starting position of the piston. In a preferred embodiment, to select a piston starting position, when the adjustment screw is rotated in a first direction, the adjustment guide body pushes the piston downwardly.

In a preferred embodiment, the adjustment guide body comprises a first opening adjacent the second end that has an axle pin extending therethrough. The axle pin engages an inside surface of the housing, thereby providing for pivotable movement of the adjustment guide body.

Preferably, the master cylinder assembly further includes a coupling member that provides operative association between the lever and the piston. The adjustment guide body further comprises a second opening extending axially therethrough, and the coupling member extends through the second opening in the adjustment guide body.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

Figure 1:
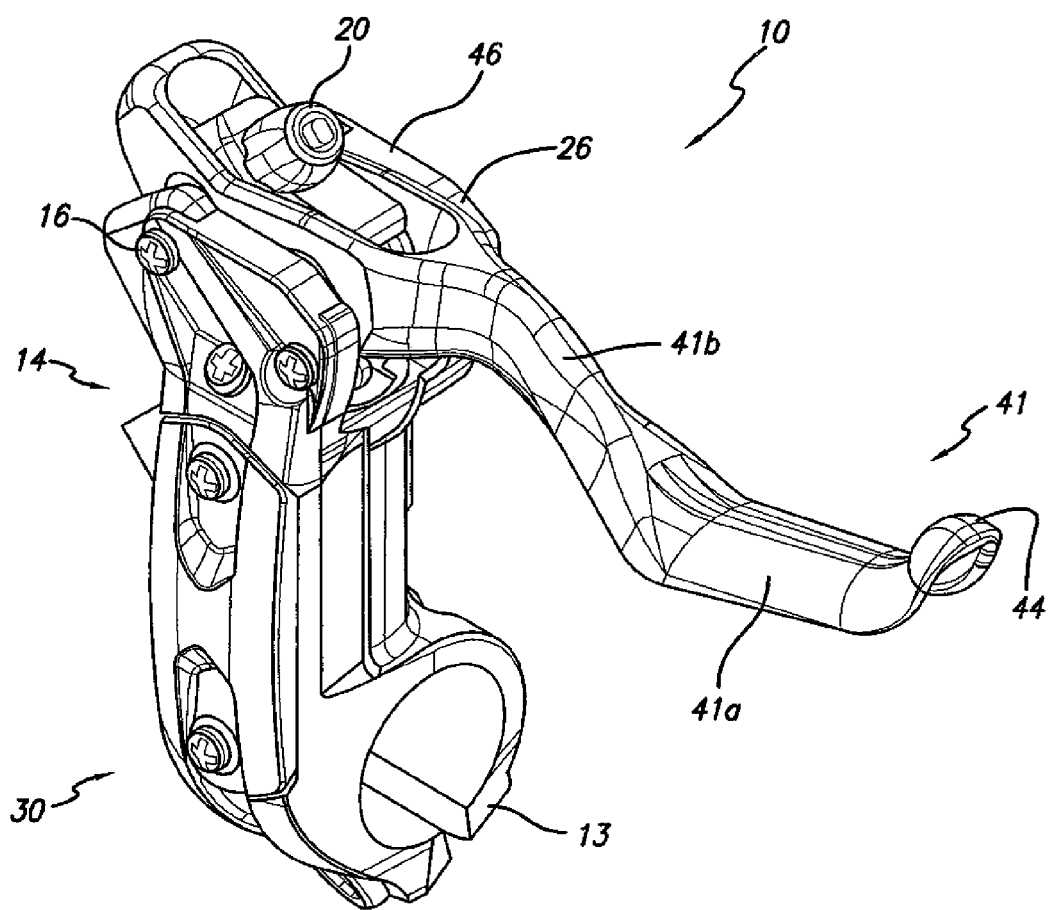
FIG. 1 is a perspective view of a master cylinder lever assembly for a hydraulic disc brake in accordance with a preferred embodiment of the present invention.
Figure 2:
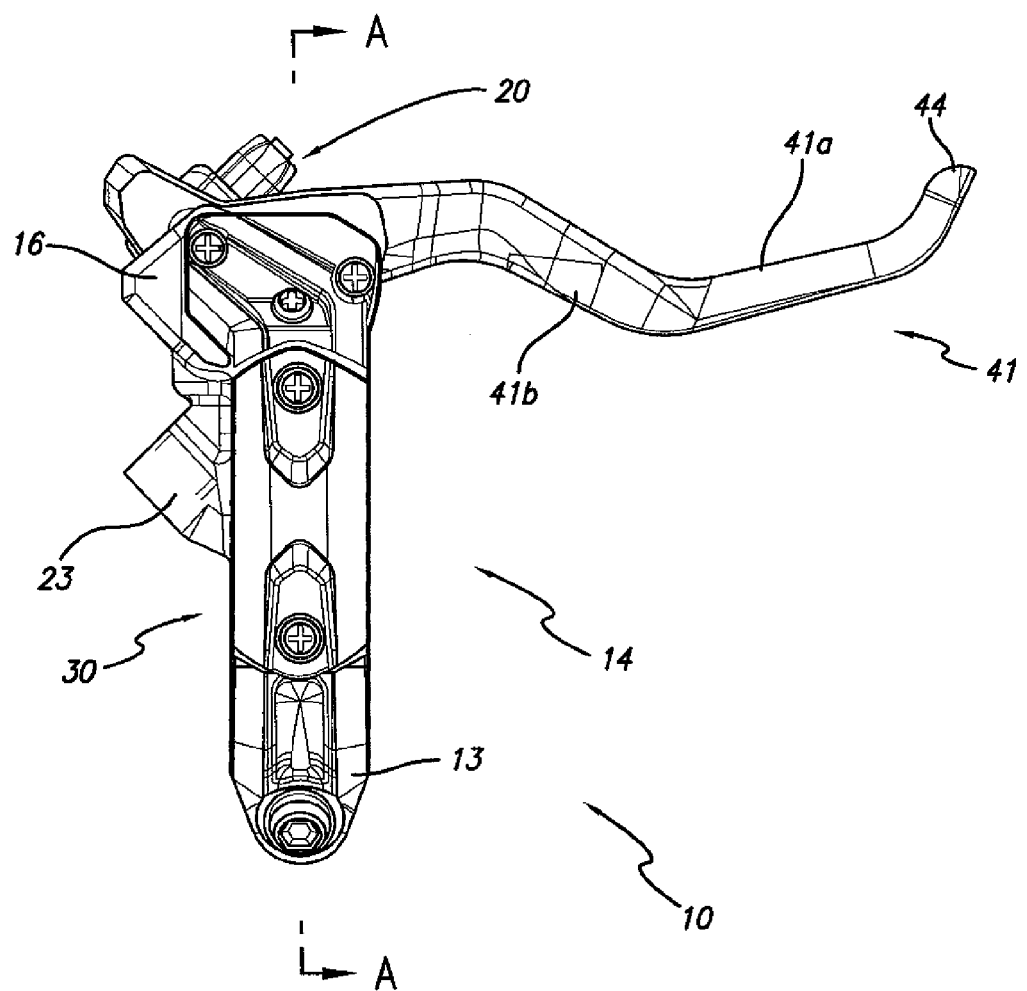
FIG. 2 is a top plan view of the hydraulic disc brake lever assembly of FIG. 1.

Referring to FIGS. 1 and 2, a preferred embodiment of a brake lever assembly 10 is shown and described. Brake lever assembly 10 is preferably a hydraulic brake lever assembly operatively connected to a hydraulic disc brake system.

It will be appreciated that terms such as "front," "back," "top," "bottom," and "side" used herein are merely for ease of description and refer to the orientation of the components as shown in the figures. It should be understood that any orientation of the brake lever assembly, and the components thereof described herein, is within the scope of the present invention.

As shown in FIGS. 1 and 2, brake lever assembly 10 is preferably attached to bicycle handlebar (not shown) by a clamp 13, or other suitable attachment mechanism. Brake lever assembly 10 generally includes a housing 14 having a first section 16 and a second section 26 and also includes a brake lever 41.

Brake lever 41 is preferably an elongated member which includes a distal end 44 that is shaped to project away from the handle bar. Lever 41 also includes proximal end 46 which engages housing 14. In an area lying between proximal end 46 and distal end 44, a relatively flat region 41a is provided which the bicycle rider uses to grip lever 10. Sloping transition 41b connects relatively flat region 41a to proximal end 46. It is preferred that sloping transition 41b and distal end 44 both project away from relatively flat region 41a to aid in retaining the rider's hand against lateral movement along the length of the lever 41.

First section 16 of housing 14 is preferably configured to facilitate pivotal movement of lever 41. Lever 41 is preferably forked at its proximal end 46. On each forked portion, an aperture is provided. The apertures are aligned with one another to define a spaced apart pair of aligned apertures.

A pivot member is retained within housing first section 16 by engaging an opening or slot defined in section 16 and by an adjustable fastener such as a lever reach adjustment nut 20 as described in U.S. Published Application No. 2006/0278031, the entirety of which is incorporated herein by reference. The pivot member is preferably cylindrical in shape and has a longitudinal axis which defines a pivot axis about which brake lever 41 is rotatable. The housing 14 is hydraulically connected to a slave cylinder which operates a hydraulic caliper (not shown) by a hydraulic line, which is connected at an outlet 23 of hydraulic master cylinder.

Housing 14 also preferably includes second section 26 which houses a preferred embodiment of a master cylinder assembly 30 (not shown in FIGS. 1-2). Second section 26 includes a pair of aligned openings or slots 28a and 28b on opposite sides of housing 14 (shown in FIGS. 3-4b). The apertures and slot pair 28a and 28b both receive a pivot member 22. The engagement of pivot member 22 with slot pair 28 and the lever aids in retaining lever 41 within housing 14 and actuating a piston 32, located therein.

As will be described below, in one aspect of the preferred embodiment, the movement of lever 41 is preferably used to force hydraulic fluid from brake lever assembly 10 to a hydraulic brake disc system.

The present invention may be used with a number of hydraulic disc brake systems, including bicycle hydraulic disc brake systems such as those described in U.S. Pat. No. 6,491,144 (the "'144 patent"), the entirety of which is incorporated herein by reference. However, the present invention is not limited to any particular hydraulic system or hydraulic disc brake system. Thus, the disclosure of the '144 patent is referenced herein to illustrate a preferred embodiment of the present invention only. As shown in FIG. 16 of the '144 patent, hydraulic disc brake systems typically comprise a caliper housing and one or more slave pistons which are movable in response to changes in hydraulic fluid pressure applied via hydraulic fluid conduits in the caliper housing. As is also shown, the slave pistons typically include a friction member, such as a brake pad.

FIG. 16 of the '144 patent shows such a hydraulic disc brake system in use on a bicycle. As indicated, in bicycle applications the caliper housing is typically placed proximate a bicycle rotor which is mounted on and rotates with a front or rear wheel of the bicycle. The brake pads are typically positioned on opposite sides of the rotor. When braking is desired, hydraulic pressure is applied to the slave pistons to force the friction members to contact the rotor. The frictional resistance of the friction members against the rotor causes the bicycle wheel to rotate more slowly and eventually to stop rotating.

Furthermore, the inventive master cylinder assembly, and in particular, the adjustment guide body and adjustment member (described below), may be used with a number of different brake lever assemblies or systems. It will be understood that the brake lever assembly shown in FIGS. 1 and 2 is merely exemplary and is not a limitation on the present invention. Any type of brake lever assembly can be used. For example, the brake lever assembly taught in U.S. patent application No. 2006/01853360 to Takizawa, which is incorporated herein in its entirety be reference, could be used.

With reference to FIGS. 3-6, a preferred embodiment of the master cylinder assembly 30 is shown. The master cylinder assembly 30 includes a master cylinder 31 which is generally a cylindrical space defined in housing 14 having a first end 31a and a second end 31b.

Figure 3:
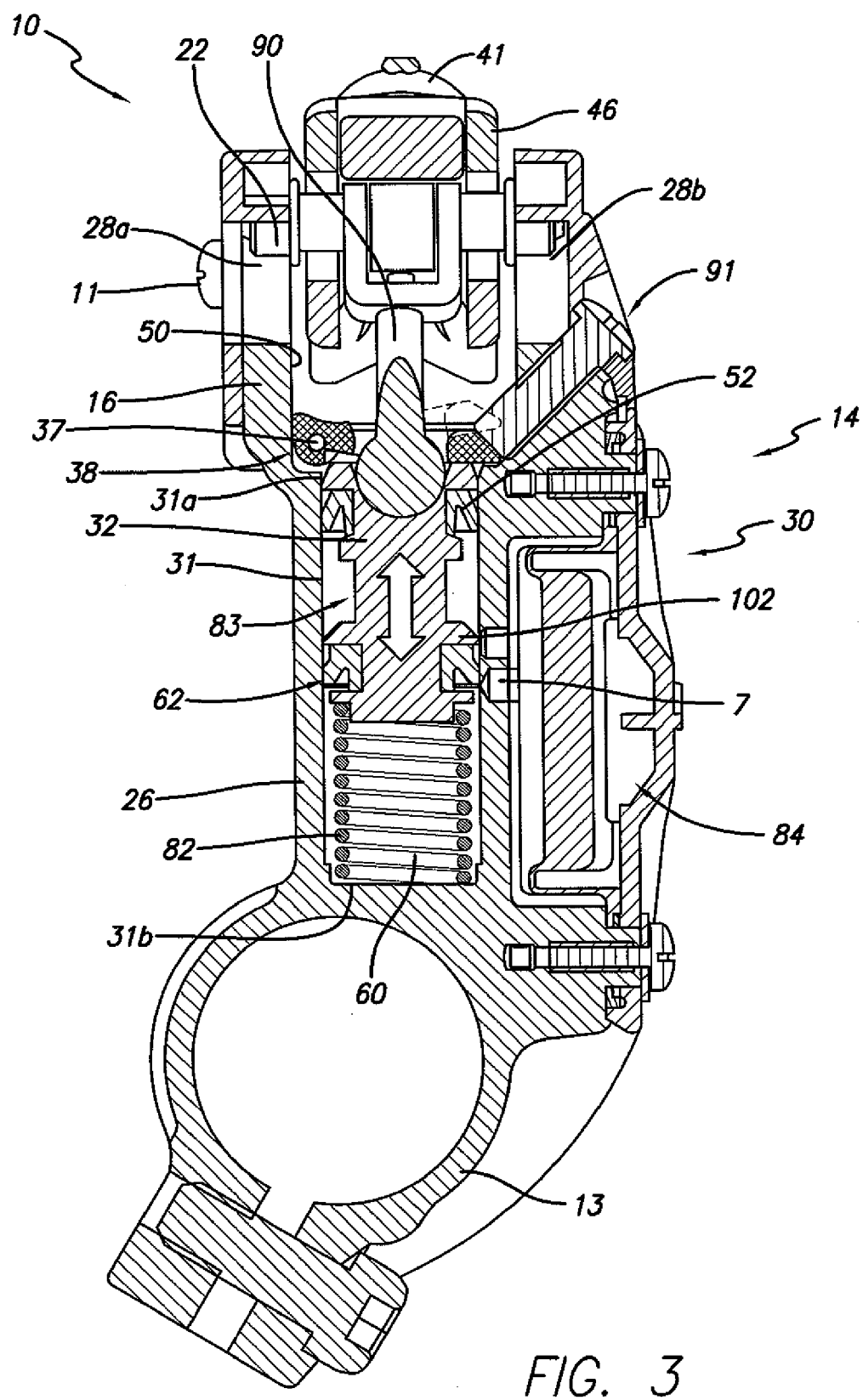
FIG. 3 is a cross-sectional view of the hydraulic disc brake lever assembly of FIG. 1 taken along line A-A' of FIG. 2 showing the adjustment guide body in both the first and second positions.
Figure 4A:
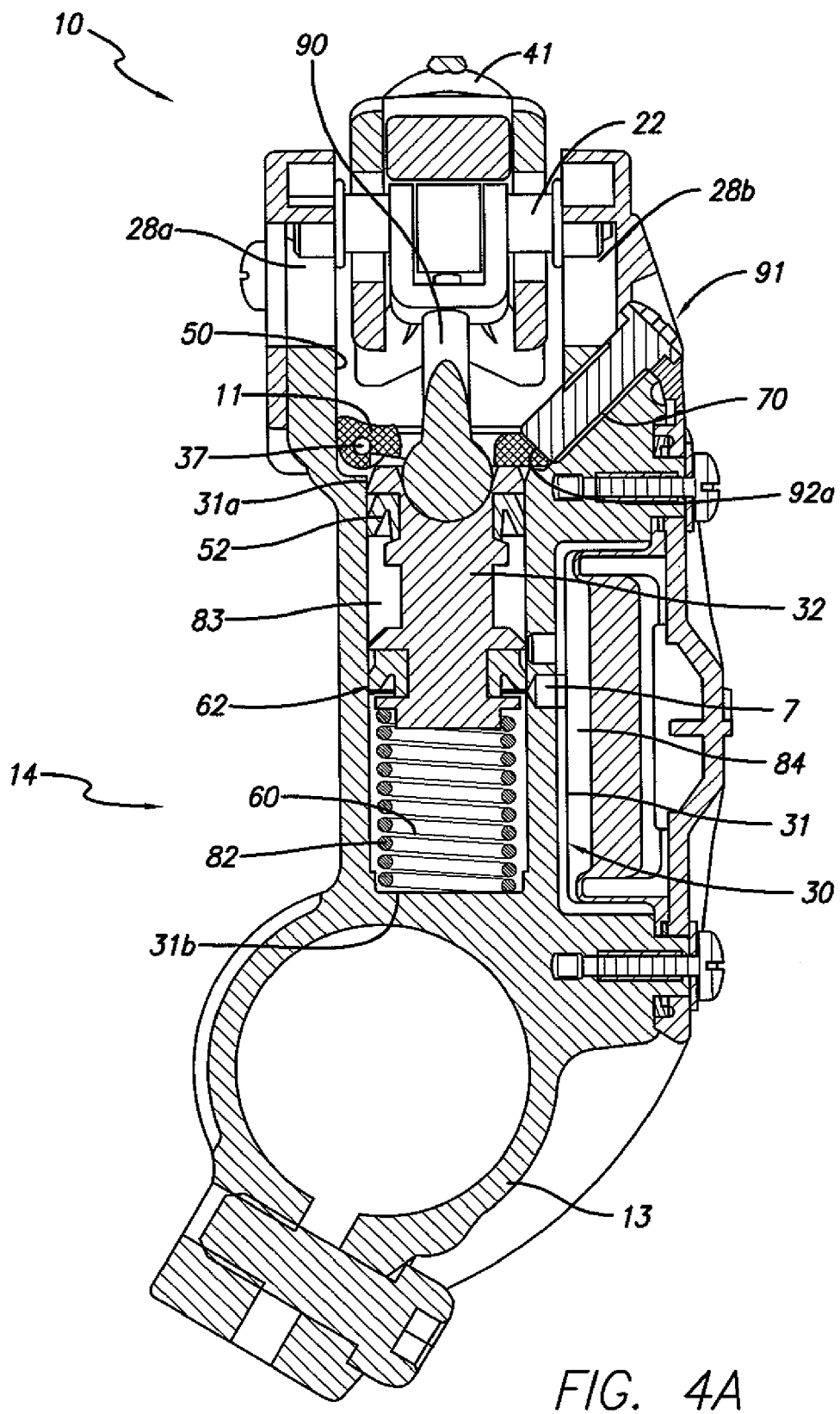
FIGS. 4A and 4B are cross-sectional views of the hydraulic disc brake lever assembly of FIG. 1 taken along line A-A' if FIG. 2 with the adjustment guide body in the first position and the second position, respectively.
Figure 4B:
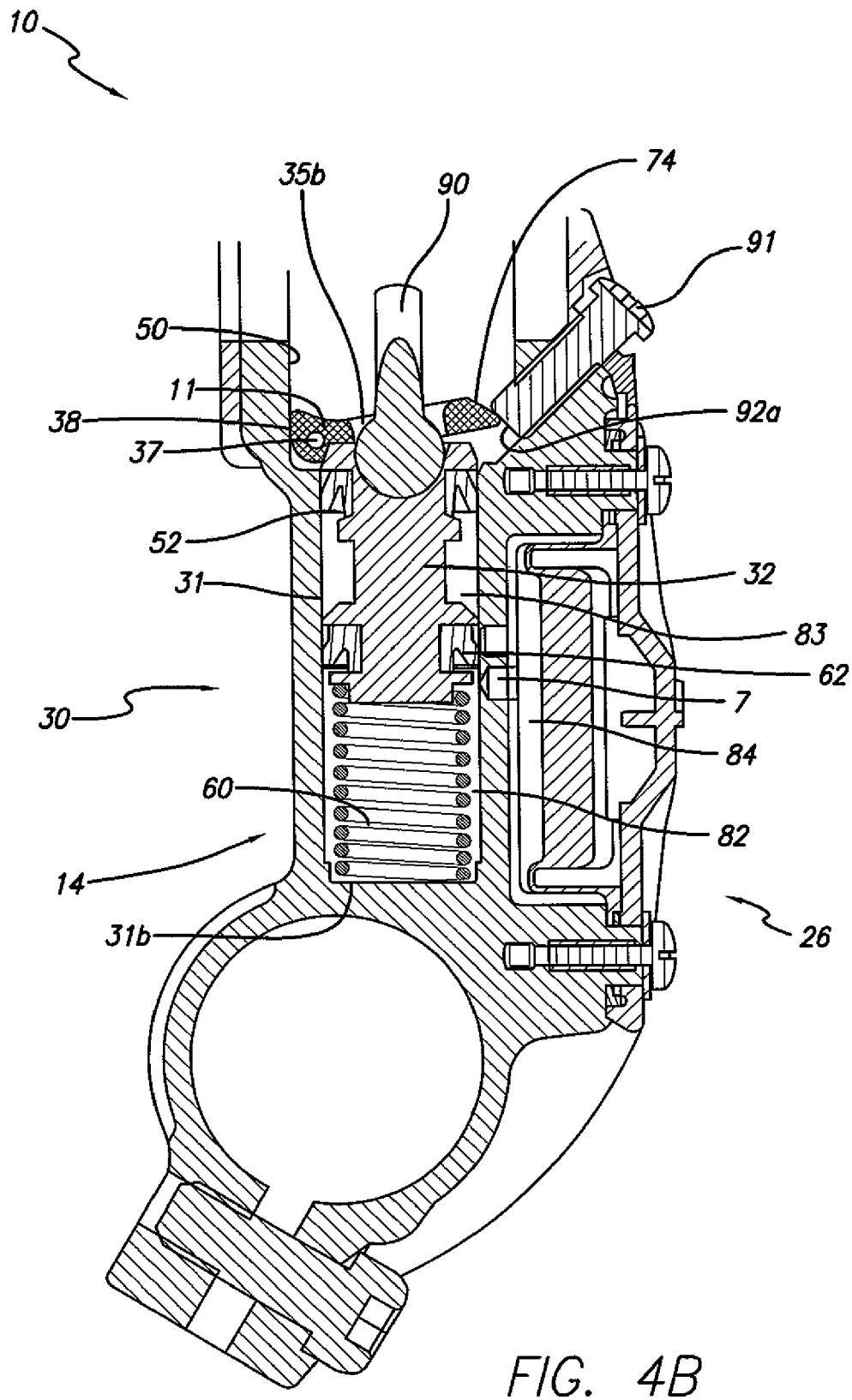

Master cylinder 31 houses master piston 32. To operatively connect lever 41 to master piston 32, one or more coupling members are preferably provided. A variety of different coupling member configurations and geometries may be used, and that shown in FIGS. 3-4B is only exemplary. As shown in FIGS. 3-4B, male coupling member 90 provides operable association between lever 41 and piston 32.

The first end of male coupling member 90 is associated with the lever and the second end of male coupling member 90 is preferably connected to the piston 32 using known attachment methods, such as a press-fit. As a result, pivotal movement of lever 41 causes piston 32 to move along the axial direction of master cylinder 31.

Piston 32 is preferably sized to closely fit within master cylinder 31 while still being movable with respect to it. Piston 32 also preferably includes at least one, and preferably a pair of circumferential grooves around its outer circumference. A cup or umbrella seal (referred to herein as first and second sealing members 52 and 62) or other suitable sealing means is preferably disposed in the circumferential grooves, which provide a seal between piston 32 and master cylinder 31 while allowing pistons 31 to move within master cylinder 31.

A first fluid containing region 82 is defined between second sealing member 62 and the second end 31b of cylinder 31. A second fluid containing region 83 is defined between first sealing member 52 and flange 102, which is a part of piston 32. When the second sealing member 62 is between port 7 and second end 31b of master cylinder 30, hydraulic fluid from the reservoir tank 84 may enter second fluid containing region 83 via the port 7. The hydraulic fluid in the second fluid containing region 83 is not pressurized.

Preferably, the master cylinder assembly 30 includes a biasing device such as a spring 60 located between master piston 32 and the second end 31b of master cylinder 31. Spring 60 preferably biases master piston 32 away from the second end 31b of master cylinder 31. Spring 60 is connected to second end 31b of master cylinder 31 by any means such as welding or gluing. One end of spring 60 is seated against the bottom surface of piston 32. Thus, as lever 41 is moved towards handlebar, piston 32 is displaced towards master cylinder bottom end 31b.

It is preferred that housing 14 include a hydraulic fluid reservoir tank 84 for storing hydraulic fluid. A port 7 is preferably provided to allow fluid communication between reservoir tank 84 and master cylinder 31. Thus when lever 41 is in the position as shown in FIGS. 3 and 4a, the second sealing member 62 is between the first end 31a of the master cylinder 31 and the port 7. Thus, as piston 32 moves toward the second end 31b of master cylinder 31 fluid is pushed out of first fluid containing region 82 and into reservoir tank 84 via port 7.

If a hydraulic disc brake is attached to lever assembly 10, when piston 32 is in the position of FIGS. 3-4a, the total volume of the hydraulic brake system will include the volume of the reservoir tank 84. As a result, the pressure in first fluid containing region 82 will be relatively low. However, as lever 41 is actuated, the operative connection between the lever 41 and the piston 32 causes piston 32 and second sealing member 62 to move towards master cylinder bottom end 31b. When seal 62 reaches port 7 or is between port 7 and the second end 31b of master cylinder 30, first fluid containing region 82 is substantially isolated from reservoir tank 84. First sealing member 62 will preferably close off port 7, and first fluid containing region 82 will be isolated from reservoir tank 84. As a result, negligible or no hydraulic fluid will enter or leave first fluid containing region 82. Because the volume of fluid in first fluid containing region 82 will be substantially fixed and because liquids such as known hydraulic fluids are substantially incompressible, piston 32 will be biased away from second end 31b of master cylinder 31 and towards the first end 31a of master cylinder 31. At this point, the overall hydraulic system volume which is available for actuating the brake system is reduced, and the system pressure begins to correspondingly increase. If the attached disc brake's fluid conduits are already liquid full, further movement will move the slave piston(s) and the attached brake pads, towards the rotor. At this point, the piston 32 is in a pressurized position.

If brake lever assembly 10 is attached to a hydraulic disc brake, once the brake pads contact the rotor, the volume of the liquid which can be displaced from master cylinder 31 will be relatively small. Because typical hydraulic fluids are substantially incompressible, further movement of piston 32 towards master cylinder second end 31b will increase the system hydraulic pressure and the frictional force applied to the rotor. However, some liquid will be displaced from master cylinder 31 even after the brake pads contact the rotor due to a variety of factors such as compressibility of the brake pads or due to system leakage.

Figure 5:
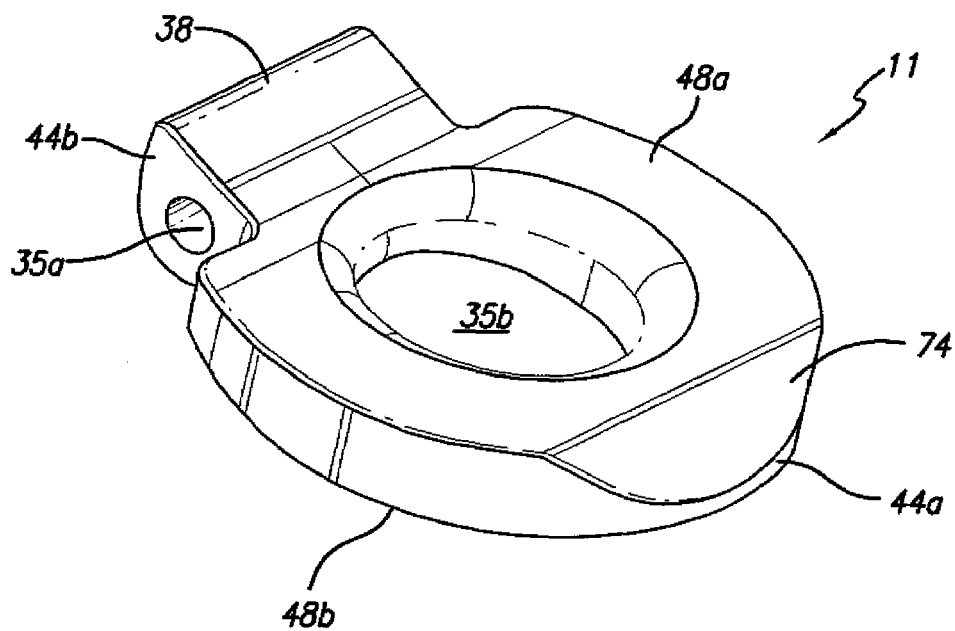
FIG. 5 is a perspective view of the adjustment guide body shown from the top.
Figure 6:
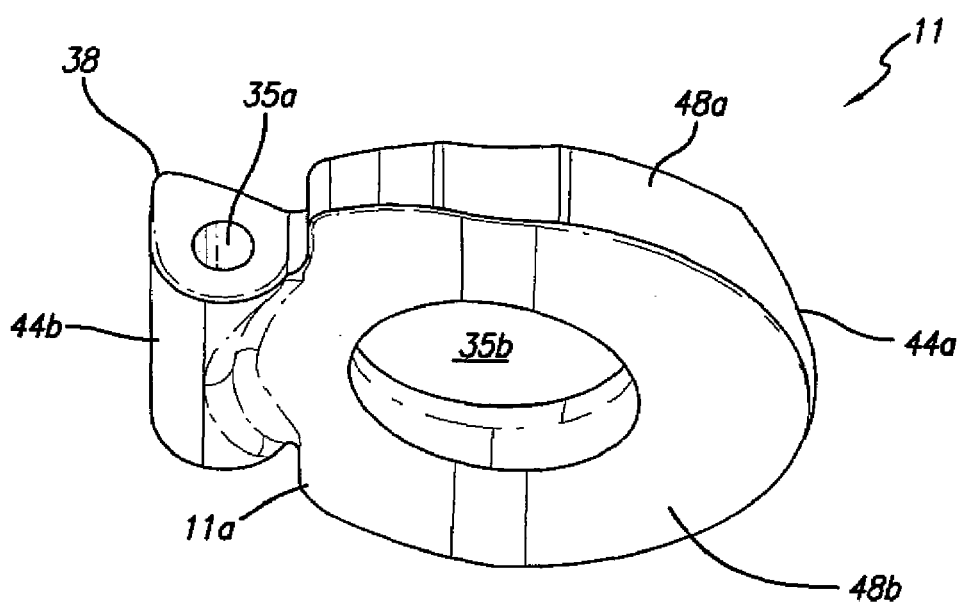
FIG. 6 is a perspective view of the adjustment guide body shown from the bottom.

In a preferred embodiment, master cylinder assembly 30 includes an adjustment guide body 11 and an adjustment member 91. As is best shown in FIGS. 5 and 6, the adjustment guide body 11 has a first end 44a, a second end 44b, an upper surface 48a, and a lower surface 48b. In a preferred embodiment, the second end 44b has a protrusion 38 that engages the inside surface 50 of the housing 14, when the adjustment guide body 11 is in a second position (described below).

In a preferred embodiment, the adjustment guide body 11 has a first opening 35a defined laterally therethrough at a location adjacent the second end 44b. An axle pin 37 extends axially through the first opening 35a. The axle pin 37 engages the inside surface 50 of the housing 14, thereby providing for pivotable movement of the adjustment guide body 11. For example, the inside surface 50 of the housing 14 may include a pair of axially aligned openings defined therein into which the opposite ends of the axle pin 37 extend.

In a preferred embodiment, the adjustment guide body pivots between a first position (shown in FIG. 4a) where the adjustment guide body 11 is flush against the top of the cylinder 31 and the piston 32, and a second position (shown in FIG. 4b). In the first position, the lower surface 48b of the adjustment guide body 11 contacts the top surface of piston 32 (the right side of the piston as shown in the figures) near the second end 44a of the adjustment guide body 11. Preferably, the adjustment guide body 11 includes a seat 11a into which a portion of the top of piston 32 (the left side of the piston as shown in the figures) fits when the adjustment guide body is in the second position.

It will be understood that as described more fully below, the movement of the adjustment member 91 causes the adjustment guide body 11 to pivot between the first position and the second position.

In a preferred embodiment, the adjustment member 91 is an adjustment screw. The adjustment member 91 preferably has a first end 92a that engages the upper surface 48a of the adjustment guide body 11. In a preferred embodiment, the upper surface 48a includes an angled portion 74 that the adjustment member 91 engages. In an alternative embodiment, the angled portion may be located on the lower surface 48b. The angled portion 74 is preferably located at the first end 44a of the adjustment guide body 11. However, this is not a limitation on the present invention. As can be seen in FIGS. 3-4B, the first end 92a of the adjusting member 91 is preferably seated against the angled portion 74 when the adjustment guide body 11 is located in the first position (FIG. 4a) and the second position (FIG. 4b). A second end 92b of the adjustment member 91 may extend outside of the housing 14 for access by a user.

Preferably, a threaded opening 70 for receiving adjustment member 91 is defined in housing 14. In an alternative embodiment, the opening may not be threaded and adjustment member 91 may be operated by being pushed or pulled.

Preferably, adjustment guide body 11 further comprises a second opening 35b extending axially therethrough. The male coupling member 90 extends through second opening 35b in adjustment guide body 11 as seen in FIGS. 3-4.

It will appreciated by those skilled in the art that the adjustment guide body 11 and adjustment member 91 are used for adjusting or selecting the starting position of piston 32. It will be further understood that first and second positions of adjustment guide body 11 are the maximum and minimum positions and that adjustment guide body 11 can be pivoted to any point therebetween.

As is known in the art, the distance between second sealing member 62 and port 7 is referred to as the dead band. During the part of lever actuation where the second sealing member 62 is between the port 7 and the first end of the cylinder, fluid in the reservoir between the seal and the port 7 is forced through the port and into the reservoir tank 84. After the second sealing member 62 passes the port 7, the cylinder is pressurized, thereby forcing hydraulic fluid into the hydraulic lines and actuating the brakes as described above. Therefore, it is highly desirable to be able to adjust the length of the dead-band in accordance with user preferences. In other words, it is desirable to be able to adjust the select starting position of the piston 32.

The adjustment guide body 11 and adjustment member 91 serve this purpose. When the adjustment guide body 11 is in the second position, the piston 32 is at a maximum distance from the port 7 (as a result of contact between protrusion 38 and housing interior surface 50. This is the maximum dead-band. To reduce the distance or dead-band the adjustment member 91 is rotated or screwed inwardly. As a result of the engagement between the second end 92*a* of the adjustment member 91 and the angled portion 74 of the adjustment guide body 11, the adjustment guide body 11 is pivoted downwardly, which, in turn, pushes piston 32 downwardly. This reduces the dead-band.

It should be understood that once the adjustment guide body 11 reaches the first position, the dead-band is at a minimum. This adjustability of the starting position of the piston using the adjustment guide body is advantageous for different users and their preferences.

The embodiments described above are exemplary embodiments of a the present invention. Those skilled in the art may now make numerous uses of, and departures from, the above-described embodiments without departing from the inventive concepts disclosed herein. Accordingly, the present invention is to be defined solely by the scope of the following claims.

What is claimed is:

1. A master cylinder assembly for a bicycle hydraulic disc brake, the master cylinder assembly comprising:
   (a) a housing defining a cylinder,
   (b) a piston received in and moveable within the cylinder, the piston moveable between a select starting position and a pressurized position,
   (c) a lever pivotably attached to the housing, the lever being operatively associated with the piston to move the piston from the select starting position to the pressurized position as the lever is pivoted between a rest position and a fully-actuated position, and
   (d) an adjustment guide body that is operatively associated with the piston, wherein the adjustment guide body is pivotable between a first position and a second position for adjusting the select starting position of the piston.

2. The master cylinder assembly of claim 1 further comprising an adjustment member having a first end that engages the adjustment guide body, wherein movement of the adjustment member causes the adjustment guide body to pivot between the first position and the second position, thereby adjusting the select starting position of the piston.

3. The master cylinder assembly of claim 2 wherein rotational movement of the adjustment member causes the adjustment guide body to pivot between the first position and the second position.

4. The master cylinder assembly of claim 3 wherein the adjustment member comprises an adjustment screw.

5. The master cylinder assembly of claim 4, wherein to select a starting position, when the adjustment screw is rotated in a first direction, the adjustment guide body pushes the piston downwardly.

6. The master cylinder assembly of claim 2 wherein the adjustment guide body comprises a first end, a second end, an upper surface and a lower surface, and wherein one of the upper and lower surface includes an angled portion adjacent the first end that engages the first end of the adjustment member.

7. The master cylinder assembly of claim 6, wherein the angled portion is defined on the upper surface.

8. The master cylinder assembly of claim 1 wherein the adjustment guide body comprises first and second ends, and wherein the second end includes a protrusion that engages an inside surface of the housing when the adjustment guide body is in the second position, thereby preventing further pivotable movement of the adjustment guide body beyond the second position.

9. The master cylinder assembly of claim 1, wherein the adjustment guide body comprises a first opening adjacent the second end that has an axle pin extending therethrough, and wherein the axle pin engages an inside surface of the housing, thereby providing for pivotable movement of the adjustment guide body.

10. The master cylinder assembly of claim 9, wherein the adjustment guide body further comprises a second opening extending axially therethrough.

11. The master cylinder assembly of claim 10, further comprising a coupling member that provides the operative association between the lever and the piston, and wherein the coupling member extends through the second opening in the adjustment guide body.

12. A master cylinder assembly for a bicycle hydraulic disc brake, the master cylinder comprising:
   (a) a housing defining a cylinder having a first and a second end,
   (b) a hydraulic fluid reservoir,
   (c) a port providing fluid communication between the cylinder and the hydraulic fluid reservoir,
   (d) a piston having a radial seal received in the cylinder, wherein the piston is movable between a select starting position with the seal between the first end of the cylinder and the port and a pressurized position with the seal between the port and the second end of the cylinder,
   (e) a lever pivotably attached to the housing, the lever being operatively associated with the piston to move the piston between the select starting position and the pressurized position as the lever is pivoted between a rest position and a fully-actuated position, and
   (f) an adjustment guide body that is operatively associated with the piston, wherein the adjustment guide body is pivotable between a first position and a second position for adjusting the select starting position of the piston.

13. The master cylinder assembly of claim 12 further comprising an adjustment member having a first end that engages the adjustment guide body, wherein movement of the adjustment member causes the adjustment guide body to pivot between the first position and the second position, thereby adjusting the select starting position of the piston.

14. The master cylinder assembly of claim 13 wherein the adjustment member comprises an adjustment screw.

15. The master cylinder assembly of claim 14 wherein the adjustment guide body comprises first and second ends, and wherein the second end includes a protrusion that engages an inside surface of the housing when the adjustment guide body is in the second position, thereby preventing further pivotable movement of the adjustment guide body beyond the second position.

16. The master cylinder assembly of claim 15 wherein the adjustment guide body comprises an upper surface and a lower surface, and wherein the upper surface includes an angled portion adjacent the first end that engages the first end of the adjustment member.

17. The master cylinder assembly of claim 16, wherein the adjustment guide body comprises a first opening adjacent the second end that has an axle pin extending therethrough, and wherein the axle pin engages an inside surface of the housing, thereby providing for pivotable movement of the adjustment guide body.

18. The master cylinder assembly of claim 17, further comprising a coupling member that provides the operative association between the lever and the piston, wherein the adjustment guide body further comprises a second opening extending axially therethrough, and wherein the coupling member extends through the second opening in the adjustment guide body.

19. The master cylinder assembly of claim 14, wherein to select a starting position, when the adjustment screw is rotated in a first direction the piston is moved toward the port and when the adjustment screw is rotated in a second direction the piston moves away from the port.

20. The master cylinder assembly of claim 19 wherein the second end of the adjustment screw extends outside of the housing.

* * * * *